US006523148B1

(12) United States Patent
Junghans

(10) Patent No.: US 6,523,148 B1
(45) Date of Patent: Feb. 18, 2003

(54) MAJORITY DECISION METHOD FOR IMPROVED FRAME ERROR RATE IN THE DIGITAL ENHANCED CORDLESS TELECOMMUNICATIONS SYSTEM

(75) Inventor: Andreas Junghans, Hallbergmoos (DE)

(73) Assignee: Koninlijke Philips Electronics N.,V., Eindhoven (NL)

( * ) Notice: Subject to any disclaimer, the term of this patent is extended or adjusted under 35 U.S.C. 154(b) by 0 days.

(21) Appl. No.: 09/377,877

(22) Filed: Aug. 19, 1999

(51) Int. Cl.[7] .......................... G06F 11/08; G08C 25/02; H04L 1/18
(52) U.S. Cl. ........................ 714/797; 714/748; 714/815; 714/822; 375/342
(58) Field of Search .................................. 714/748, 797, 714/815, 822; 370/470, 472, 474, 476, 509, 552; 375/222, 342, 370

(56) References Cited

U.S. PATENT DOCUMENTS

| 5,463,646 A | 10/1995 | Dillon et al. ................ 714/822 |
| 5,905,756 A | 5/1999 | Lamkin et al. .............. 375/222 |
| 5,968,197 A | * 10/1999 | Doiron ........................ 714/748 |
| 6,209,115 B1 | * 3/2001 | Truong et al. ............... 714/784 |

FOREIGN PATENT DOCUMENTS

GB  2325118 A  11/1998  ............ H04B/7/26

OTHER PUBLICATIONS

Cheng–Shong Wu et al: "Majority Decoded Automatic Repeat Request Error Control Schemes" Proceedings of The Global Telecommunications Conference and Exhibition (Globecom), US New York, IEEE, vol.–, Nov. 28, 1988, pp. 1648–1652, XP000011780 abstract section 2.2 section 2.3.

* cited by examiner

Primary Examiner—Emmanuel L. Moise
(74) Attorney, Agent, or Firm—Peter Zawilski

(57) ABSTRACT

A majority decision method for improved frame error rate in the digital enhanced cordless telecommunications (DECT) system. Specifically, one embodiment of the present invention includes a method for improving retransmission efficiency of a data frame within a communication system. The method includes the step of receiving and storing three corrupted versions of a data frame within a memory. Moreover, the method also includes the step of performing a byte-wise comparison of the three corrupted versions of the data frame to locate an inconsistent byte position. In response to locating the inconsistent byte position among the three corrupted versions of the data frame, the method includes the step of performing a byte-wise majority decision among the three corrupted versions of the data frame to select a correct byte value of the inconsistent byte position. Provided no correct byte value is selected by performing the byte-wise majority decision, the method also includes the step of performing a bit-wise comparison of the inconsistent byte position of the three corrupted versions of the data frame to locate an inconsistent bit position. In response to locating the inconsistent bit position among the inconsistent byte position of the three corrupted versions of the data frame, the method includes the step of performing a bit-wise majority decision to select a bit value of the inconsistent bit position.

20 Claims, 8 Drawing Sheets

| 502 | 504 | 506 | 508 | | | ⌐ 330 |
|---|---|---|---|---|---|---|
| 12 (hex) | 25 (hex) | 32 (hex) | 41 (hex) | | | |

| 510 | 512 | 514 | 516 | | | ⌐ 330a |
|---|---|---|---|---|---|---|
| 12 (hex) | 28 (hex) | 32 (hex) | 61 (hex) | | | |

| 518 | 520 | 522 | 524 | | | ⌐ 330b |
|---|---|---|---|---|---|---|
| 12 (hex) | 28 (hex) | 32 (hex) | 71 (hex) | | | |

| 526 | 528 | 530 | 532 | | | ⌐ 400 |
|---|---|---|---|---|---|---|
| 12 (hex) | 28 (hex) | 32 (hex) | | | | |

FIGURE 5

| | | | | | | | |
|---|---|---|---|---|---|---|---|
| 602 | 604 | 606 | 608 | 610 | 612 | 614 | 616 |
| 0 | 1 | 0 | 0 | 0 | 0 | 0 | 1 |

508

| | | | | | | | |
|---|---|---|---|---|---|---|---|
| 618 | 620 | 622 | 624 | 626 | 628 | 630 | 632 |
| 0 | 1 | 1 | 0 | 0 | 0 | 0 | 1 |

516

| | | | | | | | |
|---|---|---|---|---|---|---|---|
| 634 | 636 | 638 | 640 | 642 | 644 | 646 | 648 |
| 0 | 1 | 1 | 1 | 0 | 0 | 0 | 1 |

524

| | | | | | | | |
|---|---|---|---|---|---|---|---|
| 650 | 652 | 654 | 656 | 658 | 660 | 662 | 664 |
| 0 | 1 | 1 | 0 | 0 | 0 | 0 | 1 |

MAJORITY DECISION METHOD FOR IMPROVED FRAME ERROR RATE IN THE DIGITAL ENHANCED CORDLESS TELECOMMUNICATIONS SYSTEM

TECHNICAL FIELD

The present invention relates to the field of wireless telecommunication. More specifically, the present invention relates to the field of the digital enhanced cordless telecommunications (DECT) system.

BACKGROUND ART

Within the field of wireless telecommunications systems there exists a system referred to as the digital enhanced cordless telecommunications (DECT) system. Within the DECT system, a user of a cordless portable telephone handset is able to communicate with a user of another telecommunication device by way of a fixed base station utilizing wireless communication. To enable the cordless telephone handset and the base station to communicate within the DECT system, a radio interface is utilized.

Specifically, the DECT standard describes a time division multiple access (TDMA) system for residential cordless telephone and data transmission applications. Furthermore, the DECT system provides a choice of 120 independent bidirectional communication channels, commonly referred to as DECT channels. It should be appreciated that the DECT channels are spread over 10 carrier radio frequencies, typically referred to as bearers. Thus, every bearer provides 12 independent DECT channels. During communication, one or more DECT channels are established between a mobile device (e.g., portable telephone handset) and a base station. In order to share the radio bearer among 12 potential subscribers, a TDMA mechanism is utilized to divide the bearer into 24 slots. More specifically, the first 12 slots are used for the downlink communication direction which is from the fixed base station to the portable telephone handset. Furthermore, the second 12 slots are used for the uplink communication direction which is from the portable telephone handset to the base station. It should be appreciated that the cycle to transmit the 24 slots is referred to as a DECT frame. The cycle time of the DECT frame is 10 milliseconds (ms). As such, the data transmission for the downlink direction as well as for the uplink direction on all 12 DECT channels are carried out within 10 ms. Moreover, every DECT channel offers a transmission capacity of up to 32 kilobits per second (kbits/s) in each direction. It should be noted that there are problems associated within the cordless communication of the DECT system.

One of the problems experienced within the DECT system is that the radio bearers are exposed to radio frequency (RF) noise and signal reflections from time to time. These disturbances lead to corrupted user data within the DECT channels on the receiver side. It should be appreciated that the quality criteria of the DECT standard is the rate of corrupted received user data in relation to correctly received user data. The object is to keep the bit error rate as low as possible in order to obtain a high throughput of correct user data over the DECT channels. Typically, corrupted user data degrades the voice quality (e.g., crackles) of telephony applications or the corrupted user data has to be retransmitted when used in data applications. Since corrupted user data of data applications will be retransmitted, the user data throughput is degraded over the DECT channel.

Specifically, when a prior art receiver device determines that a cyclic redundancy check (CRC) or other type of error detection mechanism within a received DECT data frame is not correct, the receiver typically discards the data frame and request a retransmission of that data frame from the transmitter. It should be appreciated that user data sent over a DECT channel is protected by a CRC, which is well known by those of ordinary skill in the art. It should be further appreciated that the retransmission procedure is repeated until the data frame has been retransmitted successfully or a retransmission counter exceeds a certain value. It is appreciated that there are no provisions within the DECT standard for selective retransmission of particular portions of the data frame. If the bad transmission condition persists, the portable telephone handset is free to move the DECT channel to another slot on the same radio bearer or to another radio bearer. However, as long as the DECT channel remains on the old slot, the throughput is seriously degraded due to the retransmissions of the data frame.

There is a prior art solution to decrease the bit error rate of data frames during communication transmission within the DECT system which uses a Reed Solomon Forward Error Correction scheme, which is well known by those of ordinary skill in the art. Basically, this scheme operates by storing the last 7 data frames received and then restores any corrupted data. There are disadvantages associated with this prior art solution. One of the main disadvantages of this scheme is that it is very computationally intensive and is typically realized within hardware. As such, it can be expensive to implement. Furthermore, another disadvantage of this prior art solution is that it introduces a certain amount of overhead within the protocol software to handle the retransmissions. Therefore, it is non-transparent to the DECT base stations and portable telephone handsets thereby resulting in modifications of them in order to operate properly. A further disadvantage of this prior art solution is that it introduces an additional system delay of about 70 ms. A system delay of this size typically excludes the use of this prior art solution with DECT system remote computer terminal applications or voice applications.

Accordingly, a need exists for a method and system for providing improved efficiency of retransmitted data frames within the DECT system. A further need exists for a method and system which meets the above need but is not expensive to implement. Still another need exists for a method and system which meets the above need and is transparent to the DECT base stations and portable appliances. Yet another need exists for a method and system which meets the above need and does not introduce a significant system delay to the receiving side within the DECT system.

DISCLOSURE OF THE INVENTION

The present invention provides a method and system for providing improved efficiency of retransmitted data frames within the digital enhanced cordless telecommunications (DECT) system. Furthermore, the present invention provides a method and system which achieves the above accomplishment and is inexpensive to implement. Moreover, the present invention provides a method and system which achieves the above accomplishment and is transparent to the DECT base stations and portable appliances. Additionally, the present invention provides a method and system which achieves the above accomplishment without introducing a significant system delay to the receiving side within the DECT system.

Specifically, one embodiment of the present invention includes a method for improving retransmission efficiency of a data frame within a communication system. The method includes the step of receiving and storing three corrupted versions of a data frame within a memory. Moreover, the method also includes the step of performing a byte-wise comparison of the three corrupted versions of the data frame to locate an inconsistent byte position. In response to locating the inconsistent byte position among the three corrupted versions of the data frame, the method includes the step of performing a byte-wise majority decision among the three corrupted versions of the data frame to select a correct byte value of the inconsistent byte position. Provided no correct byte value is selected by performing the byte-wise majority decision, the method also includes the step of performing a bit-wise comparison of the inconsistent byte position of the three corrupted versions of the data frame to locate an inconsistent bit position. In response to locating the inconsistent bit position among the inconsistent byte position of the three corrupted versions of the data frame, the method includes the step of performing a bit-wise majority decision to select a bit value of the inconsistent bit position.

In another embodiment, the present invention includes the steps of the above described embodiment, and further includes the step of constructing an output version of the data frame.

In still another embodiment, the present invention includes a communication device that includes a processor, an addressable data bus coupled to the processor, and a memory device coupled to communicate with the processor for performing a method for improving retransmission efficiency of a data frame within a communication system. The method includes the step of receiving and storing three corrupted versions of a data frame within a memory. Furthermore, the method includes the step of performing a byte-wise comparison of the three corrupted versions of the data frame to locate an inconsistent byte position. In response to locating the inconsistent byte position among the three corrupted versions of the data frame, the method includes the step of performing a byte-wise majority decision among the three corrupted versions of the data frame to select a correct byte value of the inconsistent byte position. Provided no correct byte value is selected by performing the byte-wise majority decision, the method includes the step of performing a bit-wise comparison of the inconsistent byte position of the three corrupted versions of the data frame to locate an inconsistent bit position. In response to locating the inconsistent bit position among the inconsistent byte position of the three corrupted versions of the data frame, the method includes the step of performing a bit-wise majority decision to select a bit value of the inconsistent bit position.

In yet another embodiment, the present invention includes the communication device described directly above, and the method further includes the step of constructing an output version of the data frame.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 5 is a diagram illustrating one embodiment in accordance with the present invention for automatically performing a byte-wise comparison and a byte-wise majority decision of three corrupted versions of a data frame.

FIG. 6 is a diagram illustrating one embodiment in accordance with the present invention for automatically performing a bit-wise comparison and a bit-wise majority decision of a byte position of three corrupted versions of a data frame.

Figure 1:
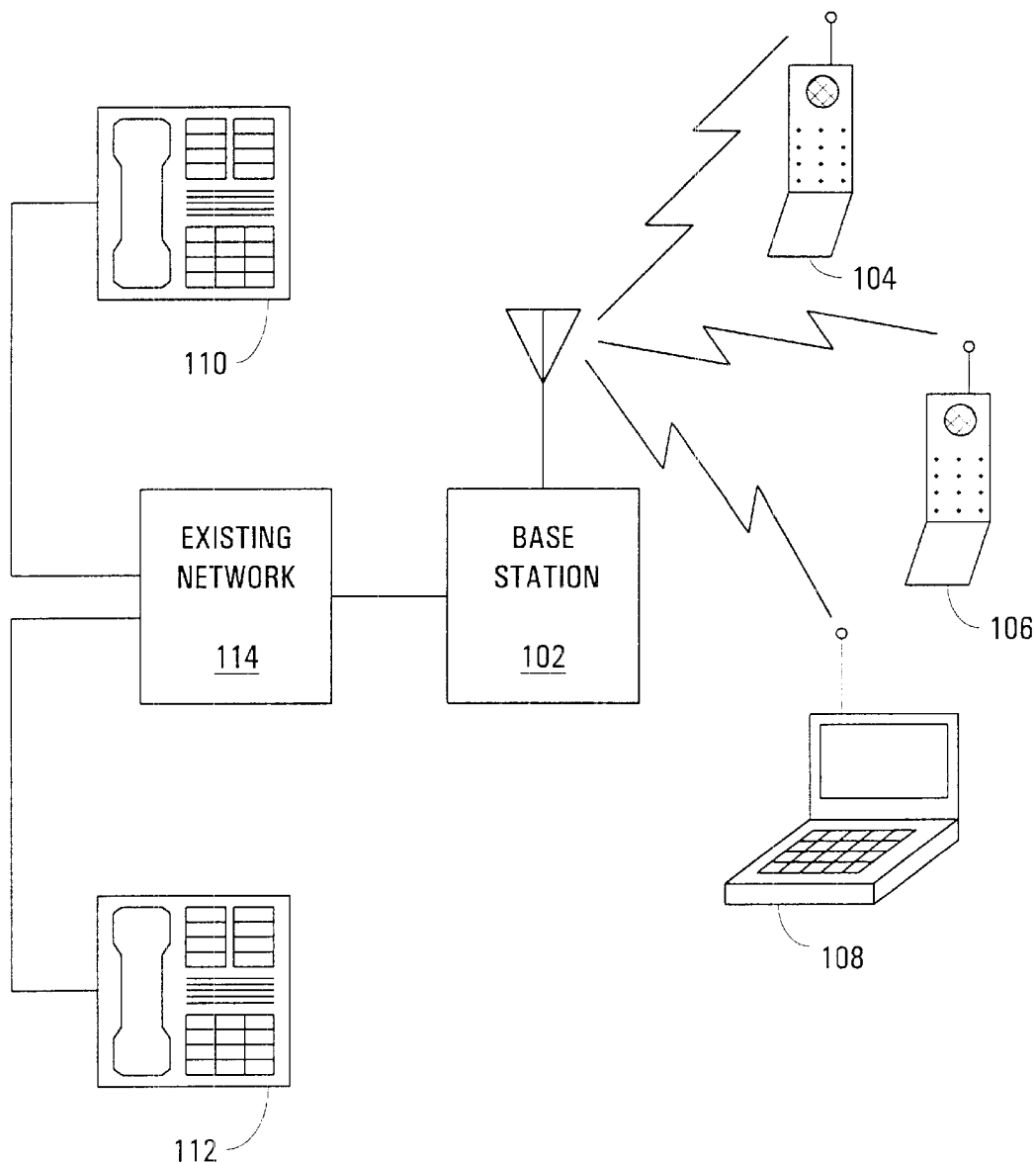
FIG. 1 is a general overview of the DECT system in which one embodiment of the present invention operates.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detail description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication system device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "storing" or "performing" or "constructing" or "fabricating" or the like, refer to the action and processes of a communication system device, or similar electronic computing device, that manipulates and transforms data. The data is represented as physical (electronic) quantities within the communication system device's registers and memories and is transformed into other data similarly represented as physical quantities within the communication system device memories or registers or other such information storage, transmission, or display devices.

DETAILED DESCRIPTION OF THE ENVIRONMENT OF THE PRESENT INVENTION

One embodiment in accordance with the present invention operates within the digital enhanced cordless telecommunications (DECT) system which provides wireless voice communication for its users. In addition to providing its users with wireless voice communication, the DECT system also provides digital data communication capabilities (e.g., computer modem communication). The DECT system has the ability to operate both indoors and outdoors, which offers greater communication opportunities. For instance, the indoor operations include using it within homes, office spaces, and hotels, whereas the outdoor operations of the DECT system include using it within suburban and city areas. The DECT system specification is well known by those of ordinary skill in the art.

FIG. 1 illustrates a general overview of a DECT system 100 in which one embodiment in accordance with the present invention operates. The two main transmitter/receiver components that comprise DECT system 100 are a base station and a cordless device (e.g., telephone handsets 104 and 106, laptop computer system 108, and the like). An embodiment in accordance with the present invention (e.g., software program) can be implemented within either or both of the base station and the cordless device. Base station 102 and cordless devices 104–108 have the ability to transmit and receive voice information along with other types of data. It should be appreciated that base station 102 and cordless devices 104–108 of DECT system 100 transmit digital data. Base station 102 is a fixed transmitter/receiver station which can be implemented by coupling it into an existing public telephone network 114. Implemented in this manner, base station 102 enables the users of cordless telephone handsets 104–108 to communicate with each other and with the users of land line-based telephones 110 and 112 which are coupled by wire to the existing public telephone network 114. The DECT system 100 uses a wireless digital radio interface to communicate information between base station 102 and cordless devices 104–108. One present invention embodiment of the digital radio interface used by DECT system 100 is a time division multiple access capability with time division duplexing (TDMA-TDD).

Within DECT system 100, the radio bearers are exposed to radio frequency (RF) noise and signal reflections which can result in corrupting user data within the DECT channels of a receiver device (e.g., base station 102), as described above. As such, it is important within the DECT system 100 to keep the bit error rate or the frame error rate as low as possible in order to obtain a high throughput of correct user data over the DECT channels. The present invention includes a method and system for providing improved efficiency of retransmitted data frames within the DECT system.

Figure 2:
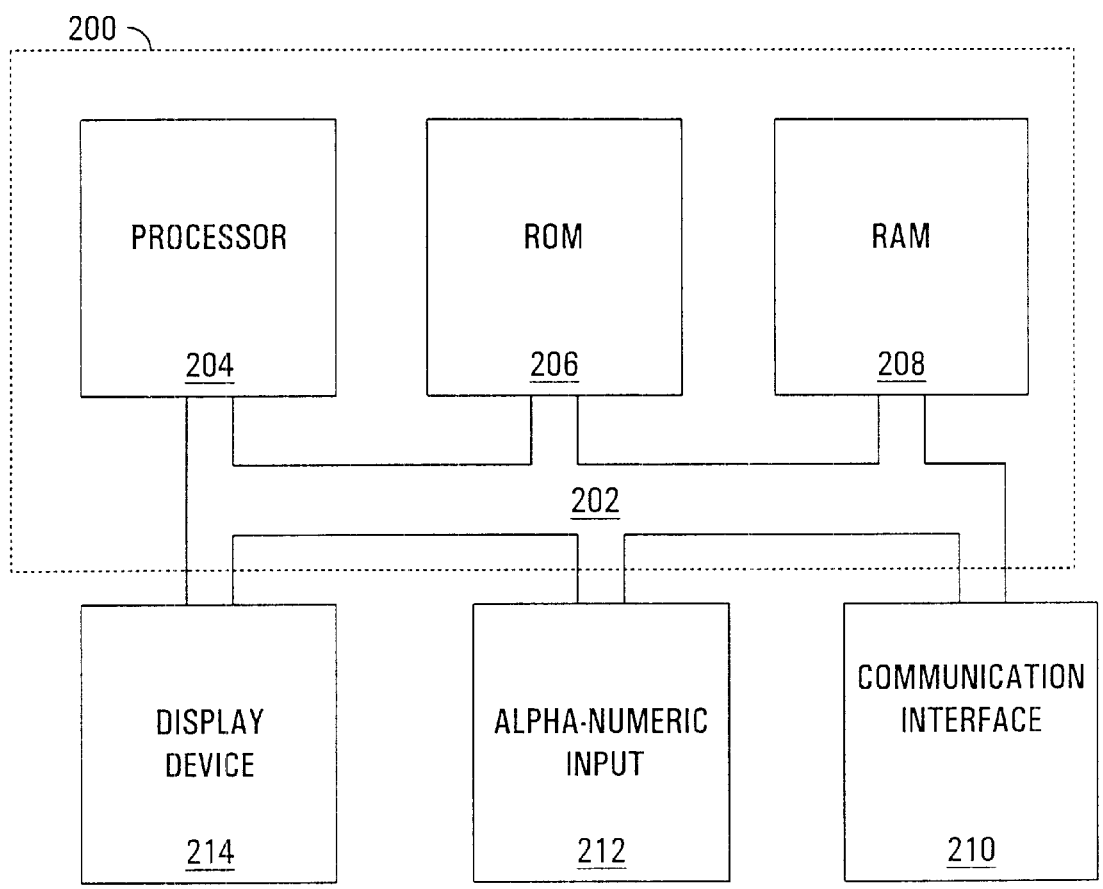
FIG. 2 is a block diagram of a communication system device used in accordance with one embodiment of the present invention.

Now referring to FIG. 2, which is a block diagram of a communication system device 200 used in accordance with one embodiment of the present invention. It should be appreciated that communication system device 200 represents circuitry implemented within base station 102 or any one of cordless devices 104–108 of DECT system 100. Within the following discussions of the present invention, certain processes and steps are discussed that are realized, in one embodiment, as a series of instructions (e.g., software program) that reside within computer readable memory units of communication system device 200 and executed by processors of communication system device 200. When executed, the instructions cause communication system device 200 to perform specific actions and exhibit specific behavior which is described in detail below.

In general, communication system device 200 of FIG. 2 used by an embodiment of the present invention comprises an address/data bus 202 for communicating information, one or more central processors 204 coupled with bus 202 for processing information and instructions, a computer readable volatile memory unit 208 (e.g., random access memory, static RAM, dynamic RAM, etc.) coupled with bus 202 for storing information and instructions (e.g., software program) for central processor(s) 204, a computer readable non-volatile memory unit 206 (e.g., read only memory, programmable ROM, flash memory, EPROM, EEPROM, etc.) coupled with bus 202 for storing static information and instructions for processor(s) 204. Optionally, communication system device 200 can include an alphanumeric input device 212 including alphanumeric and function keys coupled to bus 202 for communicating information and command selections to central processor(s) 204. Moreover, communication system device 200 can include a display device 214 coupled to bus 202 for displaying information (e.g., telephone numbers) to a user. Display device. 214 utilized with communication system device 200 of the present invention can be implemented as a liquid crystal display (LCD), a cathode ray tube (CRT), or any other display device suitable for creating graphic images and alphanumeric characters recognizable to the user. Furthermore, the communication device 200 can include a communication interface 210 (e.g., speaker, microphone, computer system, and the like) which is coupled to bus 202 for communicating information to and/or from central processor(s) 204.

Figure 3A:
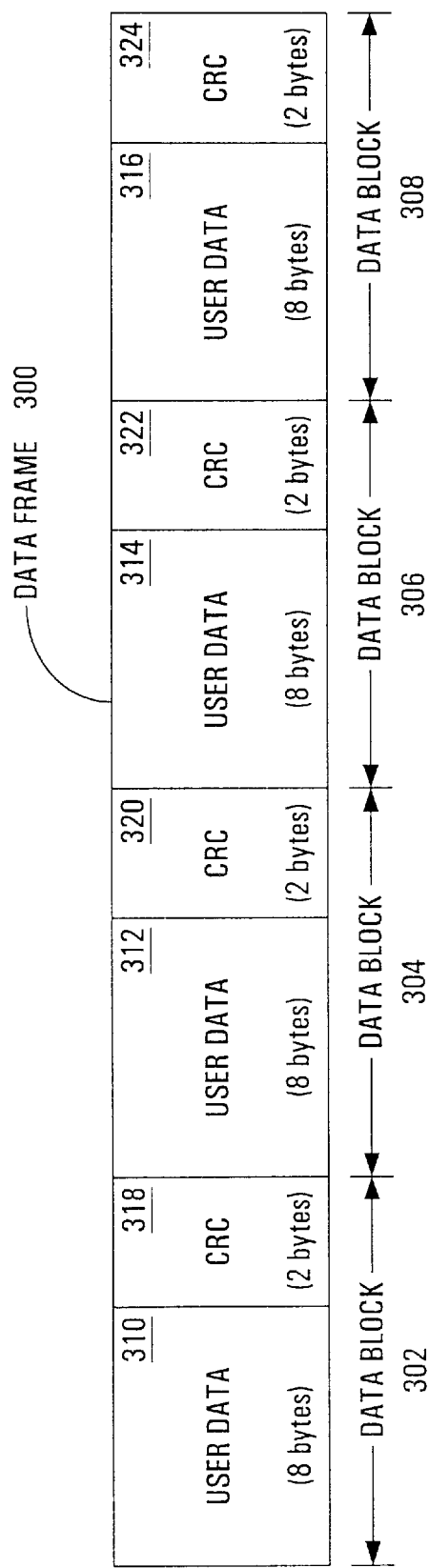
FIG. 3A is a diagram illustrating one embodiment of a data frame used to transmit data within the DECT system during a communication session between a base station and a cordless telephone handset, in accordance with the present invention.

With reference now to FIG. 3A, which is a diagram illustrating one embodiment of a data frame 300 used to transmit user data within the DECT system 100 during a communication session between base station 102 and a cordless device (e.g., telephone handset 104), in accordance with the present invention. Within the present embodiment, data frame 300 includes 40 bytes of data which are divided into four equal sized data blocks 302–308. Each data block of data blocks 302–308 includes a user data field along with a corresponding cyclic redundancy check (CRC) field. The purpose of the CRC field (e.g., 318) is to protect the integrity of the user data contained with its corresponding user data field (e.g., 310). As such, data frame 300 includes four user data fields 310–316, each containing 8 bytes of user data, along with four CRC fields 318–324, each containing 2 bytes of data. It should be appreciated that there are many other types of error detection methods (e.g., checksum) which can be used in accordance with the present embodiment. It is appreciated that the format of data frame 300 is defined within the DECT standardization as a P32 channel. It should be further appreciated that an embodiment in accordance with the present invention is well suited to operate using data frames which are defined within the DECT standardization as a P80 channel. An embodiment in accordance with the present invention is well suited to operate using many different types of data frame configurations wherein some means of error detection is provided for the user data.

Figure 3B:
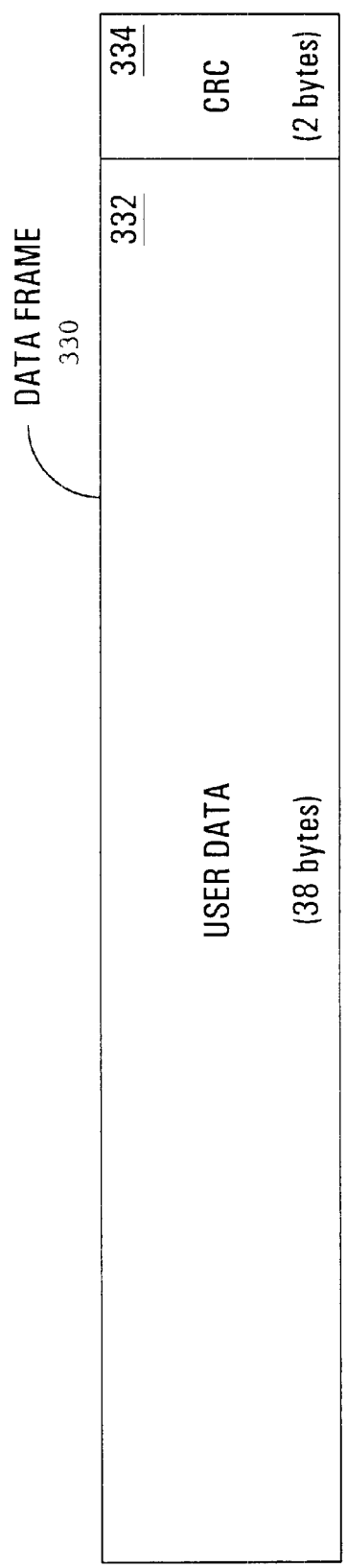
FIG. 3B is a diagram illustrating another embodiment of a data frame used to transmit data within the DECT system during a communication session between a base station and a cordless telephone handset, in accordance with the present invention.

Referring now to FIG. 3B, which is a diagram illustrating one embodiment of a data frame 330 used to transmit user data within the DECT system 100 during a communication session between base station 102 and a cordless device (e.g., telephone handset 104), in accordance with the present invention. Within the present embodiment, data frame 330 is implemented by using a proprietary transmission mode within DECT system 100, which is signaled within an A-field. The proprietary transmission mode within the DECT system is well known by those of ordinary skill in the art. As such, data frame 330 includes 40 bytes of data wherein a user data filed 332 contains 38 bytes of user data, along with a CRC field 334 that contains 2 bytes of data. As previously mentioned, the purpose of the CRC field (e.g., 334) is to protect the integrity of the user data contained within its corresponding user data field (e.g., 332). It should be appreciated that there are many other types of error detection methods (e.g., checksum) which can be used in accordance with the present embodiment. By using data frame 330 during a communication session, the user data throughput is improved by more than 18% when compared to the data throughput of using data frame 300 of FIG. 3A. As previously mentioned, an embodiment in accordance with the present invention is well suited to operate using any type of data frame configuration wherein some error detection mechanism is provided for the user data.

DETAILED DESCRIPTION OF THE OPERATION OF THE PRESENT INVENTION

Figure 4:
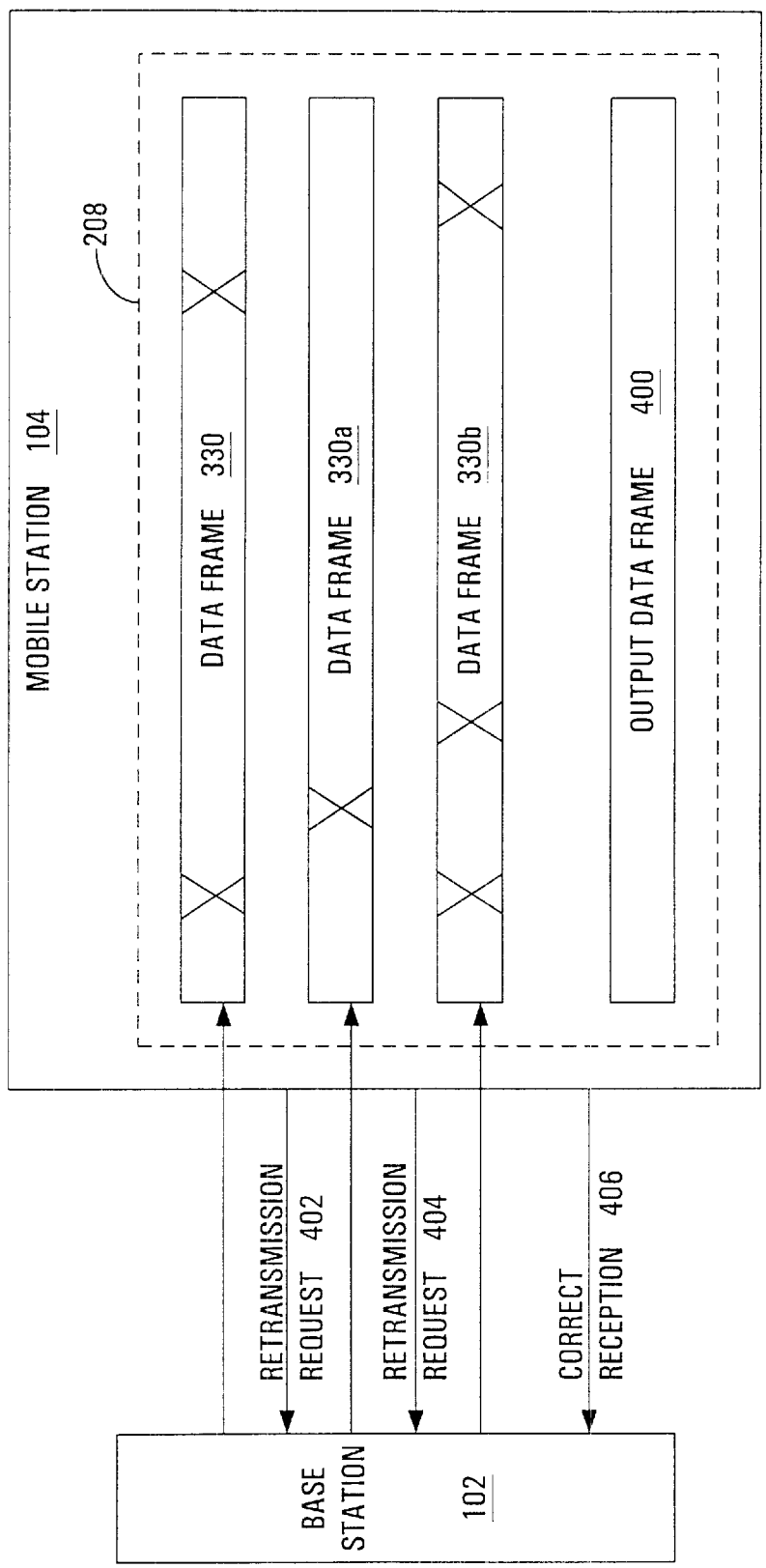
FIG. 4 is a diagram illustrating one embodiment in accordance with the present invention for automatically receiving and storing corrupted data frames and requesting retransmission of the data frame during a communication session between a base station and a cordless portable handset within the DECT system.

Now referring to FIG. 4, which is a diagram illustrating one embodiment in accordance with the present invention for automatically receiving and storing corrupted data frames and requesting retransmission of the data frame during a communication session between base station 102 and a cordless device (e.g., portable handset 104) within the DECT system 100. Basically, the idea behind the present embodiment is to receive a data frame and determine if it was corrupted during the initial transmission. If so, the receiver device requests retransmission of the data frame. After an odd number (e.g., 3, 5, 7, etc.) of transmission attempts occur without receiving the data frame correctly, the present embodiment determines what the correct data values should be within the data frame instead of requesting further retransmissions of the data frame. It should be appreciated that the present embodiment of the receiver side is transparent to the transmitter side of a communication session. Thus, the present embodiment can be used in any DECT system without modification of the DECT standard and common technical regulation (CTR).

Generally, during a communication session, the present embodiment of the present invention operating within the receiving side (e.g., mobile station 104) determines whether any of the data has been corrupted within a received data frame. If any data has been corrupted, the present embodiment stores the corrupted data frame within a buffer memory. The receiver device requests retransmission of the previously received data frame from the transmitter device. Upon reception of the retransmitted data frame, the present embodiment determines whether any of the data has been corrupted within the retransmitted data frame. If any data has been corrupted, the present embodiment also stores the corrupted retransmitted data frame within the buffer memory. If no correct version of the data frame is received, this retransmission and storage process continues until an odd number (greater than 1) of corrupted versions of the same data frame are stored within buffer memory. The present embodiment then uses the odd number of corrupted versions of the same data frame to determine the correct data values that should be within the data frame, which is described in detail below.

It should be appreciated that the present embodiment of FIG. 4 operates on communication system device 200 in order to perform the data frame reconstruction automatically on-the-fly. It should also be appreciated that the present embodiment can be combined with other means to further improve the frame error rate. It should be further appreciated that the present embodiment is well suited to operate using many different types of data frame configurations wherein error detection is utilized for the data frame.

Specifically, base station 102 transmits data frame 330 to mobile station 104. Upon reception of data frame 330, the present embodiment of mobile station 104 determines whether any of the data contained within data frame 330 is corrupted by utilizing a CRC, as described above. It is appreciated that CRC is well known by those of ordinary skill in the art. It should be further appreciated that the present embodiment is well equipped to perform any type of error detection of data. If the present embodiment determines data frame 330 contains correct data, data frame 330 is sent to a higher protocol layer within mobile station 104. But within this example, the present embodiment determines that data frame 330 contains corrupted data. As such, the present embodiment of mobile station 104 stores data frame 330 within buffer memory 208. Furthermore, upon determining corrupt data exists within data frame 330, the present embodiment directs mobile station 104 to transmit a retransmission request signal 402 to base station 102 requesting retransmission of data frame 330. It is appreciated that there are no provisions within the DECT standard for selective retransmission of particular portions of a data frame.

With reference still to FIG. 4, upon reception of retransmission request signal 402, base station 102 retransmits data frame 330a to mobile station 104. Upon reception of data frame 330a, the present embodiment of mobile station 104 determines whether the data contained within data frame 330a is corrupted by utilizing the CRC. If the present embodiment determines data frame 330a contains correct data, data frame 330a is sent to a higher protocol layer within mobile station 104. But within this example, the present embodiment determines that data frame 330a contains corrupted data. As such, the present embodiment of mobile station 104 also stores data frame 330a within buffer memory 208. Furthermore, upon determining corrupt data exists within data frame 330a, the present embodiment directs mobile station 104 to transmit a retransmission request signal 404 to base station 102 requesting retransmission of data frame 330.

Upon reception of retransmission request signal 404, base station 102 retransmits data frame 330b to mobile station 104. Upon reception of data frame 300b, the present embodiment of mobile station 104 determines whether the data contained within data frame 330b is corrupted by utilizing the CRC. If the present embodiment determines data frame 330b contains correct data, data frame 330b is sent to a higher protocol layer within mobile station 104. But within this example, the present embodiment determines that data frame 330b contains corrupted data. As such, the present embodiment of mobile station 104 stores data frame 330b within buffer memory 208. The present embodiment subsequently utilizes data frames 330, 330a, and 330b to construct an output data frame 400 containing the correct data values that should have been contained within original data frame 330, which is described below in detail.

Referring now to FIG. 5, which is a diagram illustrating one embodiment in accordance with the present invention for automatically performing a byte-wise comparison and a byte-wise majority decision of corrupted data frames 330, 330a, and 330b in order to determine the correct byte values for output data frame 400. Basically, the present embodiment first performs a byte-wise comparison of the three corrupted versions of the data frame to locate any inconsistent byte positions. In response to locating an inconsistent byte position among the three corrupted versions of the data frame, the present embodiment performs a byte-wise majority decision among the three corrupted versions of the data frame to select a correct byte value of the inconsistent byte position. The present embodiment continues this process until all the byte values are correct. If no correct byte value can be selected during the byte-wise majority decision, the present embodiment performs a bit-wise comparison and a bit-wise majority decision, which are described in detail below with reference to FIG. 6.

Specifically, the present embodiment of FIG. 5 first performs a byte-wise comparison of corrupted data frames 330, 330a, and 330b in order to located any inconsistent byte positions. The byte-wise comparison involves the present embodiment comparing the byte values of each corresponding byte position of data frames 330, 330a, and 330b. For example, the present embodiment compares the byte values of byte positions 502, 510, and 518 and determines that each byte value is equal to 12 in hexadecimal. Therefore, the present embodiment stores a hexadecimal byte value of 12 within byte position 526 of output data frame 400. Next, the present embodiment compares the byte values of byte positions 504, 512, and 520 and determines that each byte value is not of equal value. In other words, the present invention has located an inconsistent byte position among data frames 330, 330a, and 330b.

Referring still to FIG. 5, upon locating an inconsistent byte position, the present embodiment performs a byte-wise majority decision of the byte values of byte positions 504, 512, and 520 in order to select a correct byte value for byte position 528 of output data frame 400. In other words, the byte value which occurs most often among byte positions 504, 512, and 520 is chosen by the present embodiment as the correct byte value for byte position 528. Therefore, since the hexadecimal byte value of 28 occurs twice among byte positions 504, 512, and 520 while the hexadecimal byte value of 25 occurs once, the present embodiment selects 28 as the correct hexadecimal byte value to be stored within byte position 528.

Next, the present embodiment performs the byte-wise comparison on byte positions 506, 514, and 522 and determines that each byte value is equal to 32 in hexadecimal. As such, the present embodiment stores a hexadecimal byte value of 32 within byte position 530 of output data frame 400. The present embodiment then performs the byte-wise comparison on byte positions 508, 516, and 524 and determines that each byte value is not of equal value. That is, the present invention has located another inconsistent byte position among data frames 330, 330a, and 330b. As described above, upon locating an inconsistent byte position, the present embodiment performs a byte-wise majority decision of the byte values of byte positions 508, 516, and 524 in order to select a correct byte value for byte position 532. Since no byte value occurs more often than any other byte value during the byte-wise majority decision of byte positions 508, 516, and 524, the present embodiment subsequently performs a bit-wise comparison and a bit-wise majority decision to determine a byte value for byte position 532, which is described below.

Referring to FIG. 6, which is a diagram illustrating one embodiment in accordance with the present invention for automatically performing a bit-wise comparison and a bit-wise majority decision of byte positions 508, 516, and 524 in order to determine a byte value for byte position 532 of output data frame 400. Generally, the present embodiment performs a bit-wise comparison of an inconsistent byte position of the three corrupted versions of the same data frame in order to locate an inconsistent bit position. In response to locating the inconsistent bit position among the inconsistent byte position of the three corrupted versions of the data frame, the present embodiment performs a bit-wise majority decision in order to select a bit value of the inconsistent bit position. In this manner, the present embodiment eventually determines a byte value for the corresponding byte position of the output data frame.

Specifically, the present embodiment first performs a bit-wise comparison of byte positions 508, 516, and 524 in order to located any inconsistent bit positions. The bit-wise comparison involves the present embodiment comparing the bit values of each corresponding bit position of byte positions 508, 516, and 524. For example, the present embodiment compares the bit values of bit positions 602, 618, and 634 and determines that each bit value is equal to zero. Therefore, the present embodiment stores a bit value of zero within bit position 650 of byte position 532. Next, the present embodiment compares the bit values of bit positions 604, 620, and 636 and determines that each bit value is equal to 1. As such, the present embodiment stores a bit value of 1 within bit position 652 of byte position 532. The present embodiment next compares the bit values of bit positions 606, 622, and 638 and determines that each bit value is not of equal value. In other words, the present invention has located an inconsistent bit position among byte positions 508, 516, and 524.

Still referring to FIG. 6, upon locating an inconsistent bit position, the present embodiment performs a bit-wise majority decision of the bit values of bit positions 606, 622, and 638 in order to select a bit value for bit position 654 of byte position 532. In other words, the bit value which occurs most often among bit positions 606, 622, and 638 is chosen by the present embodiment as the bit value for bit position 654. Therefore, since the bit value of 1 occurs twice among bit positions 606, 622, and 638 while the bit value of zero occurs once, the present embodiment selects 1 as the bit value to be stored within bit position 654.

Next, the present embodiment performs-the bit-wise comparison on bit positions 608, 624, and 640 and determines that each bit value is not of equal value. As such, another inconsistent bit position has been located among byte positions 508, 516, and 524 by the present embodiment. Therefore, the present embodiment performs a bit-wise majority decision, as described above, in order to select a bit value for bit position 656. Specifically, since the bit value of zero occurs twice among bit positions 608, 624, and 640 while the bit value of 1 occurs once, the present embodiment selects zero as the bit value to be stored within bit position 656 of byte position 532.

With reference still to FIG. 6; the present embodiment next compares the bit values of bit positions 610, 626, and 642 and determines that each bit value is equal to zero. As such, the present embodiment stores a bit value of zero within bit position 658 of byte position 532. Next, the present embodiment compares the bit values of bit positions 612, 628, and 644 and determines that each bit value is also equal to zero. Therefore, the present embodiment stores a bit value of zero within bit position 660 of byte position 532. The present embodiment next compares the bit values of bit positions 614, 630, and 646 and determines that each bit value is equal to zero. Accordingly, the present embodiment stores a bit value of zero within bit position 662 of byte position 532. Finally, the present embodiment compares the bit values of bit positions 616, 632, and 648 and determines that each bit value is equal to 1. As such, the present embodiment stores a bit value of 1 within bit position 664 of byte position 532. In this manner, the present embodiment determines that 61 is the correct hexadecimal byte value to be stored within position 532 of output data frame 400.

Referring to FIGS. 5 and 6, it should be appreciated that the byte-wise comparison, byte-wise majority decision, bit-wise comparison, and bit-wise majority decision described above are performed until each of the byte positions of the user data of output data frame 400 contains a determined byte value. It should be further appreciated that the performance by the present embodiment of the bit-wise majority decision described above does not always result in a correct byte value stored within a particular byte position of output data frame 400. As such, once all the byte positions of output data frame 400 are filled, the present embodiment determines whether any of the data contained within output data frame 400 is corrupted by utilizing the CRC. If the present embodiment determines output data frame 400 contains correct data, the present embodiment directs mobile station 104 to transmit a correct reception signal 406 (FIG. 4) to base station 102 indicating it has received data frame 330*b* correctly. Furthermore, the present embodiment sends output data frame 400 to a higher protocol layer within mobile station 104. It should be appreciated that if data frame 330 originally contained correct data, it would have contained the exact same data as contained within output data frame 400.

But if after performing the CRC on output data frame 400, the present embodiment determines output data frame 400 does not contain correct data, the present embodiment can perform other courses of action. For example, the present embodiment can request additional retransmission of data frame 330 or it could just discard data frame 330. It should be appreciated that if the total number of corrupted versions stored within buffer memory 208 reaches 5, the present embodiment can again perform the byte-wise comparison, byte-wise majority decision, bit-wise comparison, and bit-wise majority decision described above in order to create another output data frame.

Within the present embodiment of FIGS. 4–6, it should be appreciated that each time the total number of receptions of a particular data frame is equal to an odd number of 3 or more (e.g., 5, 7, etc.), the present embodiment performs the byte-wise comparison, byte-wise majority decision, bit-wise comparison, and bitwise majority decision as described above. In order to use the present embodiment more efficiently, it should be further appreciated that a B-field transmission setup of the 'I$_p$ error correction' mode with a retransmission counter of 3 is preferable. It is appreciated that the I$_p$ error correction mode is well known by those of ordinary skill in the art. Furthermore, the present embodiment is not limited to any specific type of error detection mechanism for checking the validity of the data within a data frame. Additionally, it should be appreciated that the present embodiment is able to completely reconstruct an original data frame with correct data if the corrupted bytes of the corrupted versions of the data frame are located in different byte positions. It should also be appreciated that the present embodiment can also operate within base station 102 in a manner similar to that described above. Furthermore, it is appreciated that the present embodiment can be implemented partially or fully within hardware.

There are several advantages associated with the present embodiment described above with reference to FIGS. 4–6. For example, the present embodiment improves the frame error rate of the DECT B-fields, which are well known by those of ordinary skill in the art. Furthermore, the present embodiment improves the data throughput of DECT B-fields under erroneous conditions. Moreover, the present embodiment improves the spectrum efficiency. In other words, since a transmitter device (e.g., base station 102) does not have to retransmit a particular data frame as many times, the channel spectrum is being used more efficiently. Additionally, the present embodiment is compatible with the DECT standard. Furthermore, the present embodiment can be used with any DECT B-Field setup which offers error detection. Moreover, the present embodiment can also be used for the Cs-channel in DECT A-fields. It should be appreciated that the Cs-channel is well known by those of ordinary skill in the art.

Another advantage associated with the present embodiment described above with reference to FIGS. 4–6 is that it extends the range of radio reception within the DECT system 100. Specifically, if a bit error rate or frame error rate within a prior art DECT system goes below a particular level during a communication connection, the connection will breakdown and subsequently be lost. The reason for this connection breakdown is that the prior art DECT system relies on a whole B-field to be transmitted successfully. But with the present embodiment, a receiver device (e.g., portable station 104) can recover the data within a data frame. In this manner, the range of radio reception is extended for a particular communication session. Moreover, the present embodiment is able to operate properly independent of the frame coding within the DECT B-field. Additionally, the present embodiment does not burden the processor (e.g., 204) of the receiver device (e.g., portable station 104) because it is not computationally intensive.

It should be appreciated that during certain circumstances, the present embodiment of FIGS. 4–6 is able to perform the byte-wise comparison, byte-wise majority decision, bit-wise comparison, and bit-wise majority decision described above with improved efficiency. Basically, instead of performing the above mentioned processes on corrupted versions of an entire data frame, the present embodiment is able to limit its performance of these processes to corresponding data blocks, during certain circumstances.

For example, mobile station 104 receives from base station 102 three corrupted versions of a data frame containing multiple data blocks (e.g., 300 of FIG. 3A).

Furthermore, within each corrupted version of data frame 300, the present embodiment determines that only data block 302 is corrupted. As such, the present embodiment only performs the byte-wise comparison, byte-wise majority decision, bit-wise comparison, and bit-wise majority decision described above on the three corrupted versions of data block 302. In this manner, the present embodiment only has to perform these processes on the corresponding corrupted data blocks instead of on the entire corrupted data frames. It should be appreciated that the non-corrupted data blocks of the three corrupted versions of data frame 300 can then be used to create an output data frame to be sent to a higher protocol layer as described within co-pending U.S. patent application Ser. No. 09/377,886 concurrently filed herewith, entitled "An Automatic Memory Repeat Request for Improved Frame Error Rate in the Digital Enhanced Cordless Telecommunications System," by Andreas Junghans, attorney docket number VLSI-3179 and assigned to the assignee of the present invention and is herein incorporated by reference as background material.

Figure 7:
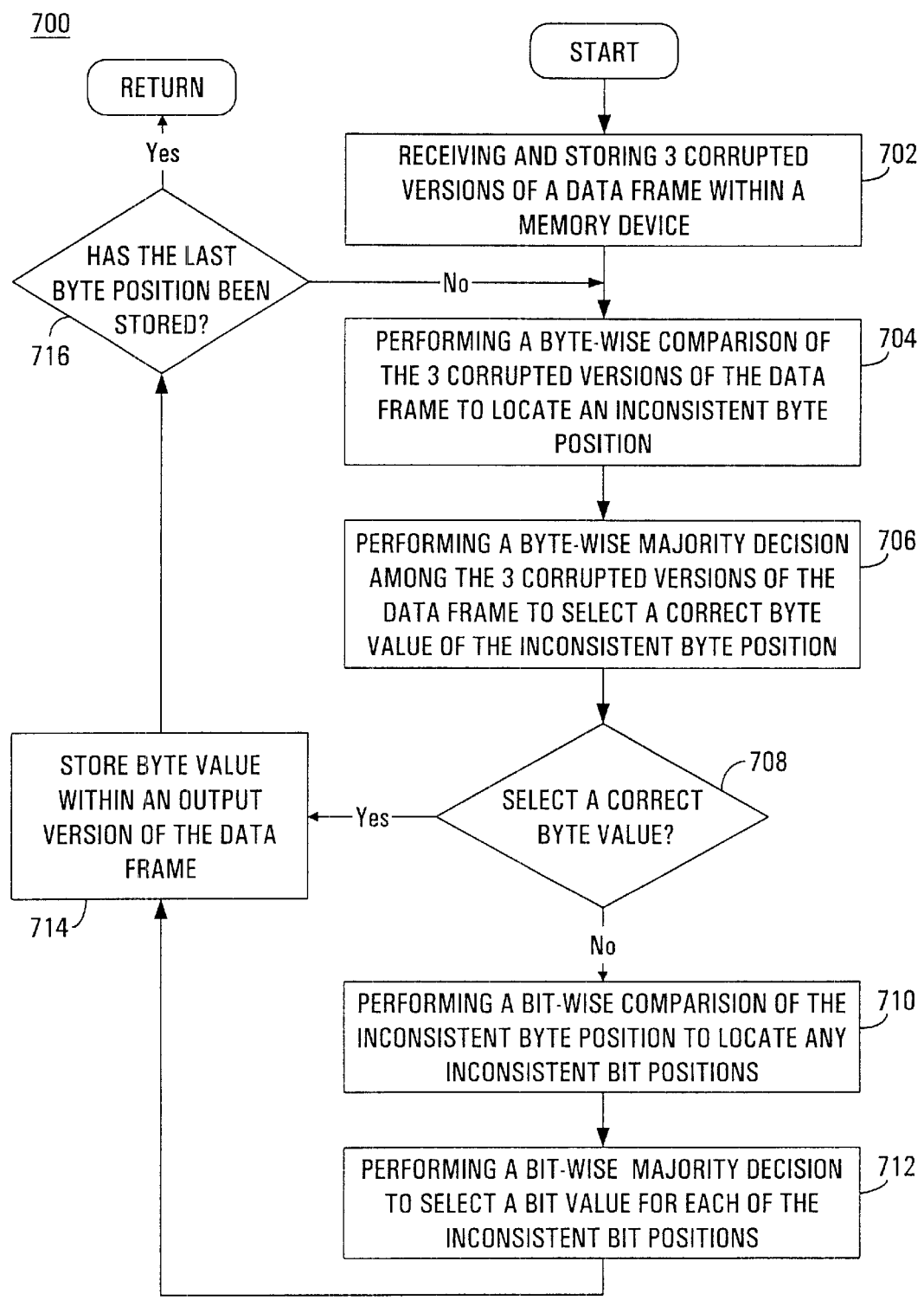
FIG. 7 is a flowchart of steps performed in accordance with one embodiment of the present invention for automatically performing a reconstruction of a previously received corrupted data frame.

With reference now to FIG. 7, a flowchart 700 of steps performed in accordance with one embodiment of the present invention for automatically performing a reconstruction of a previously received corrupted data frame is shown. Flowchart 700 includes processes of the present invention which, in one embodiment, are carried out by a processor and electrical components under the control of computer readable and computer executable instructions. The computer readable and computer executable instructions reside, for example, in data storage features such a computer usable volatile memory 208 and/or computer usable non-volatile memory 206 of FIG. 2. Although specific steps are disclosed in flowchart 700, such steps are exemplary. That is, the present invention is well suited to performing various other steps or variations of the steps recited in FIG. 7.

In step 702, a receiver device (e.g., base station 102) receives three corrupted versions of a data frame from a transmitter device (e.g., mobile handset 104). The present embodiment of the receiver device stores the three corrupted versions of the data frame within a memory device (e.g., RAM 208).

At step 704 of FIG. 7, the present embodiment of the receiver device performs a byte-wise comparison of the three corrupted versions of the data frame in order to locate an inconsistent byte position, as described above. Upon locating an inconsistent byte position, the present embodiment proceeds to step 706.

In step 706, the present embodiment of the receiver device performs a byte-wise majority decision among the three corrupted versions of the data frame in order to select a correct byte value of the inconsistent byte position, as described above.

At step 708 of FIG. 7, the present embodiment of the receiver device determines whether a correct byte value can be selected for the inconsistent byte position, as previously described. If a correct byte value can be selected for the inconsistent byte position, the present embodiment of the receiver device proceeds to step 714. If the correct byte value cannot be selected for the inconsistent byte position, the present embodiment proceeds to step 710.

In step 710, the present embodiment of the receiver device performs a bit-wise comparison of the inconsistent byte position of the three corrupted versions of the data frame in order to locate any inconsistent bit positions, as described above. Upon locating the inconsistent bit positions, the present embodiment proceeds to step 712.

At step 712 of FIG. 7, the present embodiment of the receiver device performs a bit-wise majority decision in order to select a bit value for each of the inconsistent bit positions, as described previously. Upon selecting the bit value for each of the inconsistent bit positions, the present embodiment proceeds to step 714.

In step 714, within the memory device, the present embodiment of the receiver device stores the determined byte value of the corresponding byte position within an output version of the data frame, as described above. In this manner, the present embodiment reconstructs the original data frame from the determined byte values.

At step 716 of FIG. 7, the present embodiment of the receiver device determines if the last byte position of the output version of the data frame has been stored within the memory device. If the last byte position of the output version of the data frame has not been stored within the memory device, the present embodiment proceeds to step 704. If the last byte position of the output version of the data frame has been stored within the memory device, the present embodiment exits flowchart 700.

Thus, the present invention provides a method and system for providing improved efficiency of retransmitted data frames within the digital enhanced cordless telecommunications (DECT) system. Furthermore, the present invention provides a method and system which achieves the above accomplishment and is inexpensive to implement. Moreover, the present invention provides a method and system which achieves the above accomplishment and is transparent to the DECT base stations and portable telephone handsets. Additionally, the present invention provides a method and system which achieves the above accomplishment without introducing a significant system delay to a receiver device within the DECT system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for improving retransmission efficiency of a data frame within a communication system, said method comprising the steps of:

(a) receiving and storing three corrupted versions of a data frame within a memory;

(b) performing a byte-wise comparison of said three corrupted versions of said data frame to locate an inconsistent byte position;

(c) in response to locating said inconsistent byte position among said three corrupted versions of said data frame, performing a byte-wise majority decision among said three corrupted versions of said data frame to select a correct byte value of said inconsistent byte position;

(d) provided no correct byte value is selected by performing said byte-wise majority decision, performing a bit-wise comparison of said inconsistent byte position of said three corrupted versions of said data frame to locate an inconsistent bit position; and (e) in response to locating said inconsistent bit position among said inconsistent byte position of said three corrupted versions of said data frame, performing a bit-wise majority decision to select a bit value of said inconsistent bit position.

2. The method for improving retransmission efficiency of a data frame within a communication system as described in claim 1 further comprising the step of:

(f) constructing an output version of said data frame.

3. The method for improving retransmission efficiency of a data frame within a communication system as described in claim 1 wherein said step (a) comprises:

receiving and storing said three corrupted versions of said data frame within said memory, wherein said three corrupted versions of said data frame are received within a digital enhanced cordless telecommunications (DECT) system.

4. The method for improving retransmission efficiency of a data frame within a communication system as described in claim 1 wherein said step (a) comprises:

receiving and storing said three corrupted versions of said data frame within said memory, wherein said data frame comprises a user data.

5. The method for improving retransmission efficiency of a data frame within a communication system as described in claim 1 wherein said step (a) comprises:

receiving and storing said three corrupted versions of said data frame within said memory, wherein said memory is located within a base station.

6. The method for improving retransmission efficiency of a data frame within a communication system as described in claim 1 wherein said step (a) comprises:

receiving and storing said three corrupted versions of said data frame within said memory, wherein said memory is located within a mobile device.

7. The method for improving retransmission efficiency of a data frame within a communication system as described in claim 1 wherein said step (a) comprises:

receiving and storing said three corrupted versions of said data frame within said memory, wherein said memory is located within a communication device.

8. A method for improving retransmission efficiency of a data frame within a communication system, said method comprising the steps of:

(a) within a communication system, receiving and storing three corrupted versions of a data frame within a memory device;

(b) performing a byte-wise comparison of said three corrupted versions of said data frame to locate an inconsistent byte position;

(c) in response to locating said inconsistent byte position among said three corrupted versions of said data frame, performing a byte-wise majority decision among said three corrupted versions of said data frame to select a correct byte value of said inconsistent byte position;

(d) provided no correct byte value is selected by performing said byte-wise majority decision, performing a bit-wise comparison of said inconsistent byte position of said three corrupted versions of said data frame to locate an inconsistent bit position; and (e) in response to locating said inconsistent bit position among said inconsistent byte position of said three corrupted versions of said data frame, performing a bit-wise majority decision to select a bit value of said inconsistent bit position.

9. The method for improving retransmission efficiency of a data frame within a communication system as described in claim 8 further comprising the step of:

(f) fabricating an output version of said data frame.

10. The method for improving retransmission efficiency of a data frame within a communication system as described in claim 8 wherein said step (a) comprises:

within said communication system, receiving and storing said three corrupted versions of said data frame within said memory device, wherein said communication system is a digital enhanced cordless telecommunications (DECT) system.

11. The method for improving retransmission efficiency of a data frame within a communication system as described in claim 8 wherein said step (a) comprises:

within said communication system, receiving and storing said three corrupted versions of said data frame within said memory device, wherein said data frame comprises user data.

12. The method for improving retransmission efficiency of a data frame within a communication system as described in claim 8 wherein said step (a) comprises:

within said communication system, receiving and storing said three corrupted versions of said data frame within said memory device, wherein said memory device is located within a communication base station.

13. The method for improving retransmission efficiency of a data frame within a communication system as described in claim 8 wherein said step (a) comprises:

within said communication system, receiving and storing said three corrupted versions of said data frame within said memory device, wherein said memory device is located within a mobile communication device.

14. The method for improving retransmission efficiency of a data frame within a communication system as described in claim 8 wherein said step (a) comprises:

within said communication system, receiving and storing said three corrupted versions of said data frame within said memory device, wherein said memory device is located within a communication device.

15. A communication device comprising:

a processor;

an addressable data bus coupled to said processor;

a memory device coupled to communicate with said processor for improving retransmission efficiency of a data frame within a communication system, said memory device performing the functions of:

(a) receiving and storing three corrupted versions of a data frame within a memory;

(b) performing a byte-wise comparison of said three corrupted versions of said data frame to locate an inconsistent byte position;

(c) in response to locating said inconsistent byte position among said three corrupted versions of said data frame, performing a byte-wise majority decision among said three corrupted versions of said data frame to select a correct byte value of said inconsistent byte position;

(d) provided no correct byte value is selected by performing said byte-wise majority decision, performing a bit-wise comparison of said inconsistent byte position of said three corrupted versions of said data frame to locate an inconsistent bit position; and (e) in response to locating said inconsistent bit position among said inconsistent byte position of said three corrupted versions of said data frame, performing a bit-wise majority decision to select a bit value of said inconsistent bit position.

16. The communication device as described in claim 15 further comprising the step of:

(f) constructing an output version of said data frame.

17. The communication device as described in claim 15 wherein said communication system is a digital enhanced cordless telecommunications (DECT) system.

18. The communication device as described in claim 15 wherein said step (a) comprises:

receiving and storing said three corrupted versions of said data frame within said memory, wherein said data frame comprises a user data.

19. The communication device as described in claim 15 wherein said communication device comprises a base station.

20. The communication device as described in claim 15 wherein said communication device comprises a mobile device.

\* \* \* \* \*